(12) United States Patent
Sonnaillon

(10) Patent No.: US 9,812,967 B2
(45) Date of Patent: Nov. 7, 2017

(54) INRUSH CURRENT LIMITING METHOD BASED ON BUCK+BOOST TOPOLOGY

(71) Applicant: Pacific Power Source, Inc., Irvine, CA (US)

(72) Inventor: Maximiliano O. Sonnaillon, Santa Fe (AR)

(73) Assignee: Pacific Power Source, Inc., Irvine, CA (US)

( * ) Notice: Subject to any disclaimer, the term of this patent is extended or adjusted under 35 U.S.C. 154(b) by 0 days.

(21) Appl. No.: 14/999,524

(22) Filed: May 19, 2016

(65) Prior Publication Data

US 2016/0344292 A1    Nov. 24, 2016

Related U.S. Application Data

(60) Provisional application No. 62/179,905, filed on May 21, 2015.

(51) Int. Cl.
| | |
|---|---|
| *H02M 3/158* | (2006.01) |
| *H02M 1/32* | (2007.01) |
| *H02M 1/36* | (2007.01) |
| *H02M 1/00* | (2006.01) |

(52) U.S. Cl.
CPC ......... *H02M 3/1582* (2013.01); *H02M 1/32* (2013.01); *H02M 1/36* (2013.01); *H02M 2001/0009* (2013.01)

(58) Field of Classification Search
CPC . H02M 2001/0003; H02M 2001/0009; H02M 2001/0025; H02M 2001/0032; H02M 1/32; H02M 1/36; H02M 3/156; H02M 3/157; H02M 3/158; H02M 3/1582; H02M 3/1584
See application file for complete search history.

(56) References Cited

U.S. PATENT DOCUMENTS

| | | | |
|---|---|---|---|
| 6,445,165 B1 | 9/2002 | Malik et al. | |
| 6,487,098 B2 | 11/2002 | Mallk et al. | |
| 6,862,201 B2 | 3/2005 | Hodge | |
| 8,415,933 B2* | 4/2013 | Loikkanen | G05F 1/618 323/225 |
| 2008/0055946 A1* | 3/2008 | Lesso | H02M 3/158 363/63 |
| 2008/0164859 A1* | 7/2008 | Peng | H02M 3/157 323/318 |

(Continued)

OTHER PUBLICATIONS

Kevin Covi, A Combined Buck and Boost Converter for Single-Phase Power-Factor Correction, 2005 IBM Power and Cooling Technology Symposium, Oct. 7, 2005, USA.

(Continued)

*Primary Examiner* — Emily P Pham
*Assistant Examiner* — Shahzeb K Ahmad
(74) *Attorney, Agent, or Firm* — Gibbs & White P.C.; Frankin E. Gibbs (57) ABSTRACT

A cascaded buck+boost inrush limiter is claimed where the buck converter is only allowed to switch for very short times and stays turned on, or off, during steady state operation. The inrush limiter has a control system having a digital controller and an analog comparator for controlling the buck and boost converters. The system utilizes a single loop current feedback.

3 Claims, 6 Drawing Sheets

(56) References Cited

U.S. PATENT DOCUMENTS

| | | | | |
|---|---|---|---|---|
| 2009/0039852 A1* | 2/2009 | Fishelov | ............... | H02M 3/157 323/283 |
| 2012/0146594 A1* | 6/2012 | Kobayashi | .......... | H02M 3/1582 323/234 |
| 2015/0229215 A1* | 8/2015 | Choudhary | ............. | H02M 1/14 323/271 |
| 2015/0280559 A1* | 10/2015 | Vaidya | ................ | H02M 3/1582 323/271 |
| 2015/0381039 A1* | 12/2015 | Hari | ........................ | H02M 1/15 323/271 |

OTHER PUBLICATIONS

Ray Ridley, Analysis and Design of a Wide Input Range Power Factor Correction Circuit for Three-Phase Applications, IEEE, 1993.

Laurent Gonthier, Inrush-current limiter circuits (ICL) with Triacs and Thyristors (SCR) and controlled bridge design tips, STMicroelectronics AN4606 Application note, 2015.

Texas Instruments, C28x Digital Power Library, Module User's Guide, Mar. 2015.

Yiqing Zhao, Single Phase Power Factor Correction Circuit With Wide Output Voltage Range, Thesis, Virginia Polytechnic Institute and State University, Feb. 6, 1998.

\* cited by examiner

INRUSH CURRENT LIMITING METHOD BASED ON BUCK+BOOST TOPOLOGY

RELATED APPLICATIONS

This application claims priority under 35 U.S.C. §119 to U.S. Provisional Application No. 62/179,905 filed on May 21, 2015 the contents of which are incorporate herein by reference in its entirety.

FIELD OF THE INVENTION

This invention generally relates to inrush current limiting for power supplies, power converter systems, and the like.

BACKGROUND OF THE INVENTION

Most modern power supplies have a bank of capacitors at the input, which is completely discharged when the unit is off and needs to be charged with energy coming from the mains to start operation. During startup a high current condition or inrush can occur that may damage the equipment and also trip the external circuit breakers or fuses. Several prior art techniques have been used to limit the current inrush.

Figure 1:
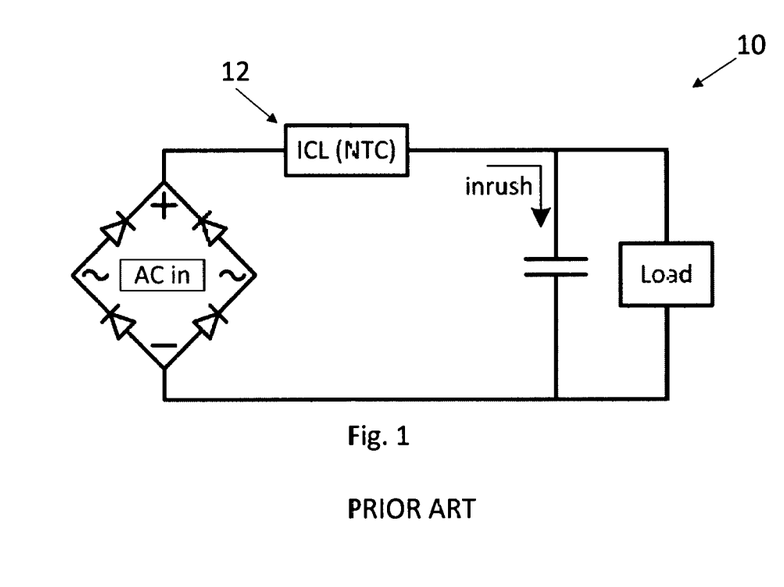
FIG. 1 is a schematic diagram of a prior art inrush limiting circuit.

FIG. 1 is a diagram of one such method. It illustrates a negative temperature coefficient (NTC) in rush limiter (10). For low power applications, the current can be limited with a variable resistor in series. An NTC type resistor (12) allows reduction of power dissipation when the unit is operation, because the circulating current creates the necessary heat to make the resistance go down. Usually special resistors designed for this purpose (inrush current limiter, ICL) need to be used to guarantee that they will withstand the high pulse of energy during the capacitor bank charging.

Figure 2:
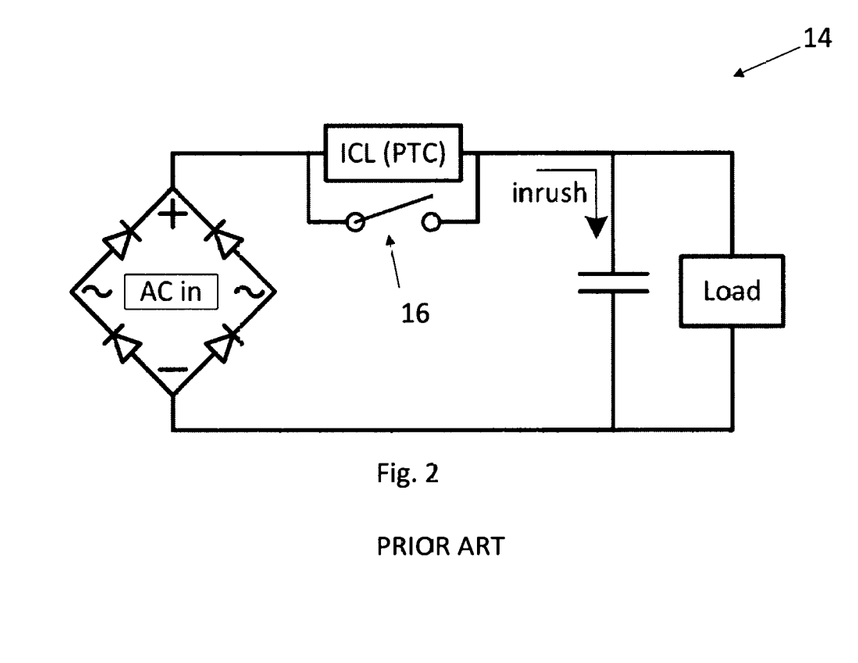
FIG. 2 is a schematic diagram of another prior art inrush limiting circuit.
Figure 3:
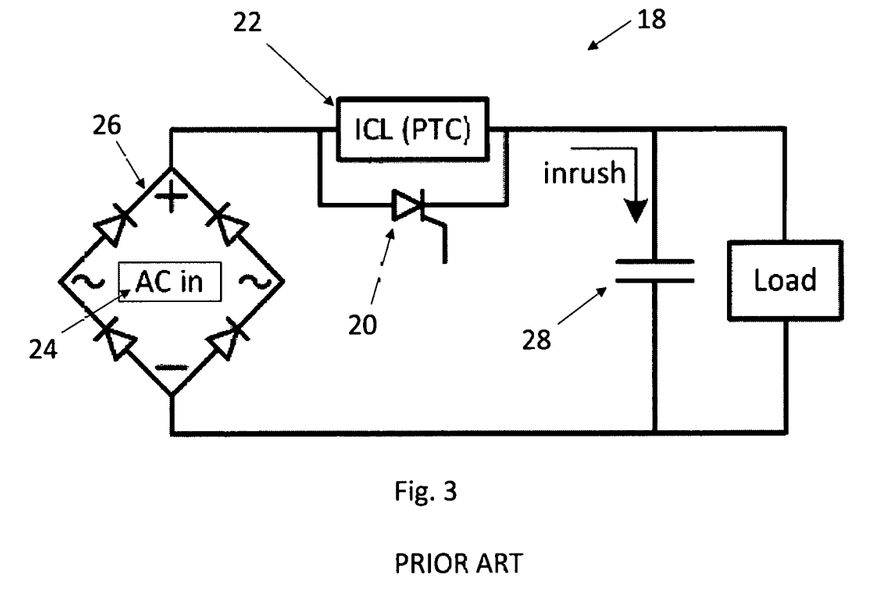
FIG. 3 is a schematic diagram of another prior art inrush limiting circuit.

At high power (single phase or three phase), if the NTC ICL (12) resistor is kept in series with the input current, the nominal current will cause undesired power dissipation in steady state making the ICL resistor (12) too big and expensive. The solution for that is to bypass it with a switch (16) once the capacitors are charged as illustrated in the rush limiter (14) of FIG. 2. In FIG. 3, the inrush limiter (18) utilizes a thyristor (20) or Silicon Controlled Rectifier (SCR) is used instead of the switch. There is also an AC power source (24), a bridge (26) and capacitor (28). In order to minimize the power dissipation in the resistor and to prevent catastrophic failures in case the SCR fails to close, normally a positive temperature coefficient type is used. In this instance, there is a positive temperature coefficient (PTC) thermistor (22).

The key drawback is that this technique is based on a dissipative charging. One improvement is to use a transistor and switch it based on the actual measured current, as described in U.S. Pat. No. 6,862,201 to Hodge. The Hodge invention is based on a resistor to limit inrush but has an insulated gate bipolar transistor (IGBT) that can be turned off. This makes it inconvenient to limit secondary inrush in most applications because during this transient the capacitors need to be charged very quickly, and this is not possible with a resistor designed to provide soft start at power up.

In order to avoid the size and extra power dissipation of the resistor in the previous techniques, it is desirable to use solid state switches to provide a non-dissipative soft start. A zero crossing detection circuit can be used to control an SCR or a transistor (see as example U.S. Pat. No. 6,445,165 to Malik, et al., limited to single phase only). These techniques have two main disadvantages. First, slow charging time is long: they need several line cycles because they only conduct for a small portion of them each. Secondly, they don't provide protection for secondary inrush.

Figure 4:
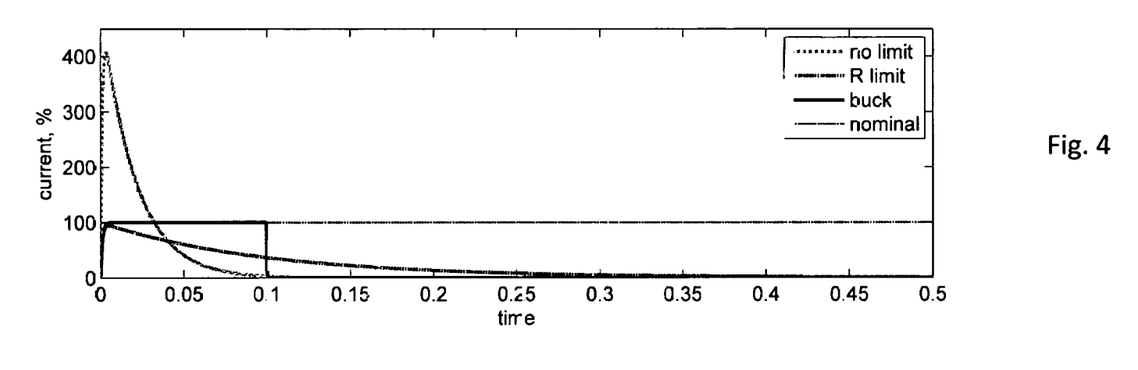
FIG. 4 is a graph of a comparison of input current during start-up.
Figure 5:
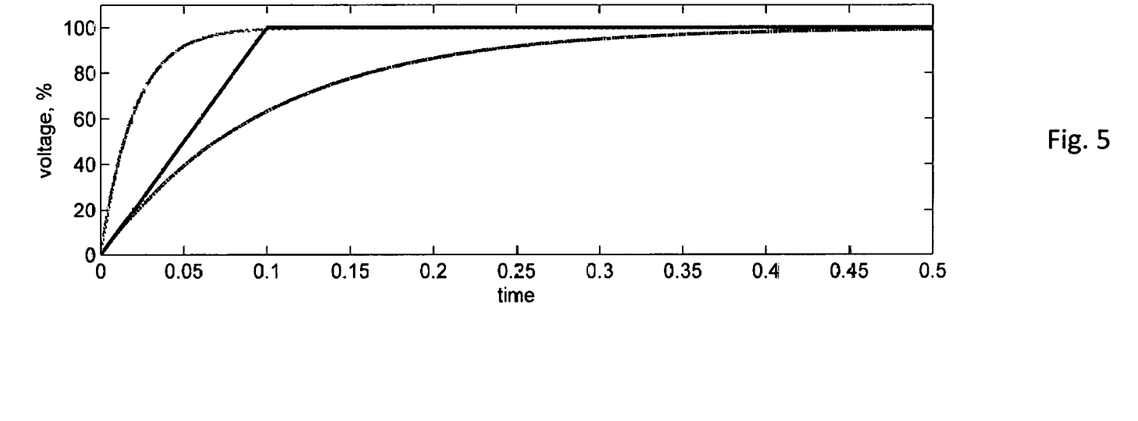
FIG. 5 is a graph of a comparison of voltage during start-up.

In order to overcome the previous disadvantages, a high frequency pulse width modulated (PWM) stage can be employed to limit the input current. Buck and boost topologies have also been used. The U.S. Pat. No. 6,487,098 to Malik, et al is a buck-boost converter that inverts the output voltage polarity. Both switches operate all the time. There are also Cascaded Buck+Boost Power Factor Corrections (PFCs). The PFCs could be frequency filters, but this typically requires larger inductors and/or capacitors, which in turn impact size, cost, and power dissipation. FIG. 4 is a comparison of input current during startup. FIG. 5 is a comparison of capacitor voltage during start-up. The 3 cases shown are: a) no inrush limit, b) traditional resistor based inrush limit, c) buck based inrush limit. The maximum desired current is assumed to be 100% in the plots. Using the constant current provided by PWM results in a much more efficient charging (shorter time without exceeding current limit).

There are several advantages of using a buck converter to limit inrush. For example, an optimum charging time of the DC capacitors, because they are charged with constant (max) current. FIG. 5 shows an example of the same system with different inrush limiting techniques. Since the buck converter provides an optimum charging current, the time is minimized without exceeding the limit. With a minimum amount of capacitance, it allows to successfully make it through severe brown-outs (a drop in normal voltage in the system) by providing optimum current limiting during the so called secondary inrush. Also, the buck transistor provides extra protection against failures in the power stages.

The methods listed above are all intended to provide a wide input range so the buck converter is active during normal operation. This makes the buck components (transistor and diode) dissipate significant power due to conduction and switching losses. These losses drive the size and cost of a unit, making these solutions not economically viable to limit inrush current. This explains why they have not been massively adopted in the industry in spite of their technical benefits.

What is needed is a buck and boost topology that dissipates less power than using traditional buck and boost techniques.

SUMMARY OF THE INVENTION

In accordance with the present disclosure, a cascaded buck+boost inrush limiter is operable where the buck converter is only allowed to switch for very short times and stays turned on, or off, during steady state operation. The limiter has an input bridge, a buck converter with a buck switch and the buck converter connected to the input bridge, a boost converter having a boost switch and the boost converter connected to the buck converter, and common passive components shared by the buck converter and the boost converter, the common passive components comprising an inductor and capacitor.

There is also a control system connected to the buck and boost converters to control the buck and boost converters. The control system has a digital controller for receiving inductor current measurements for a duty cycle command from a single loop current feedback during operation. The control system is operable such that when the duty cycle command equals zero, then the converters are off and when the duty cycle command is higher than zero but less than one the boost converter stays off but the buck converter goes from 0 to 100% duty, and when the duty cycle command is between one and two the buck stays at 100% and the boost goes from 0 to 100% duty, and if the maximum buck switching time is exceeded (i.e., output command greater than 0 and less than 1), then the control system shuts down the converters. In the shutdown neither of the converters are operating.

The control system also has an analog comparator for peak current detection and during operation if a peak current is detected the buck and boost converters are shut down.

BRIEF DESCRIPTION OF THE DRAWINGS

The invention is generally shown by way of reference to the accompanying drawings in which.

DETAILED DESCRIPTION OF THE INVENTION

The present invention addresses the main problem found in inrush limiting methods that use a buck converter, controlling its power dissipation. The controller precisely monitors for how long the buck stays switching and allows it to switch for a very limited amount of time, dramatically preventing power dissipation caused by switching losses. This allows a device optimized for low voltage drop and that minimizes conduction losses, thus providing further reduction in power dissipation.

In one embodiment of the invention, the front end consists of a diode bridge (single phase or three phase), followed by a buck converter that limits the inrush currents to a well-defined programmable value. The buck converter is followed by a boost converter (or several boost converters in parallel) that regulates the DC voltage at the output capacitors, which usually feed a DC to DC converter (or AC to DC).

Figure 6:
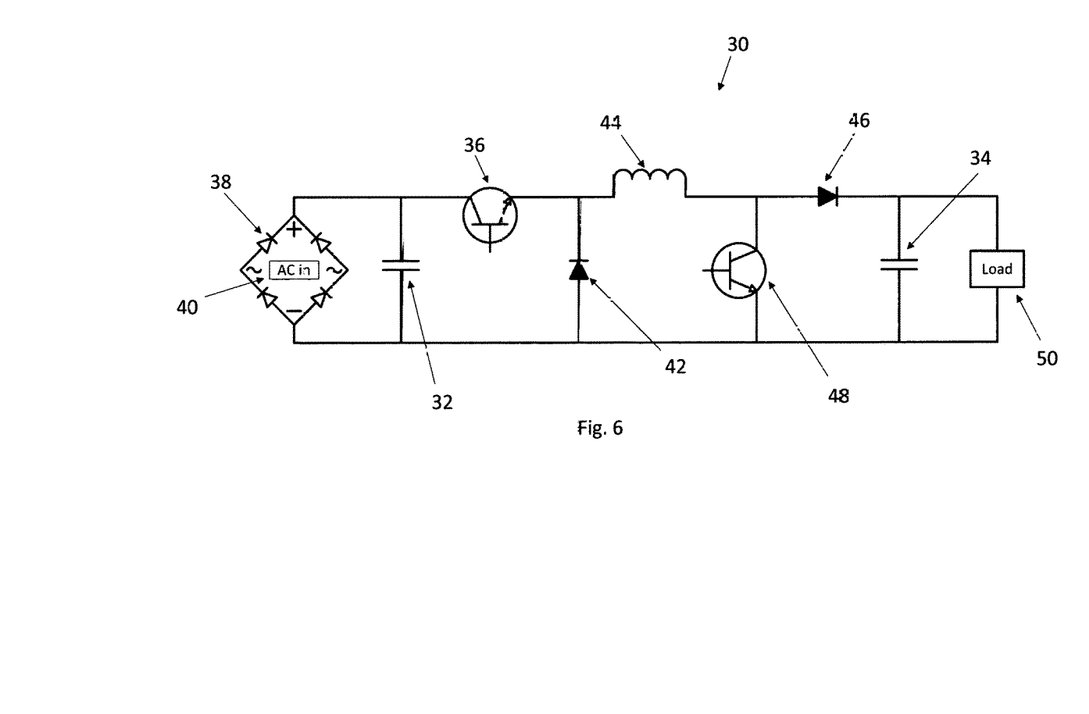
FIG. 6 is a schematic diagram of a buck+boost inrush limiting circuit.

FIG. 6 shows a diagram of a cascaded buck+boost topology (30) used as a front end in a single phase application. There is a buck switch (36), an AC power source (40), buck diode (42), inductor (44), bridge (38), boost diode (46), boost switch (48), and load (50). The buck converter used for inrush limiting adds only 2 semiconductors, because the passive components—inductor and input (32) and output (34) capacitors—are necessary. The boost converter for power-factor correction needs the input inductor (44) and output capacitance (34), and the capacitance after the diode bridge (32) is usually necessary for EMI reasons. The gate of transistor switches (36) and (48) are activated according to the state of the duty cycle as shown in the embodiment in FIG. 7 and the corresponding discussion.

Since cascaded buck and boost converters can share their passive components, the combination of them is often referred to cascaded buck boost, combined buck boost, or buck+boost. It is worth to note that this buck+boost is not the same as the traditional buck-boost topology. The buck-boost is a different family of converters, with a different principle of operation that causes an inversion of the output voltage polarity. The buck-boost has a basic implementation with one transistor and derived schemes that use two transistors.

The buck converter of FIG. 6 uses the same passive components as the boost converter, so the only extra components are the semiconductors. The buck stays at 100% duty at steady state to eliminate switching losses, thus an ultra-low Vice device can be used and the buck diode does not dissipate any power at steady state. The buck converter is only allowed to switch during short periods of time, so the power dissipation hardware is dramatically reduced for the buck converter.

In this invention the buck switching frequency is significantly lower (e.g. 1/2) than the boost frequency and this allows further optimization of the system. Lower buck switching frequency reduces the power dissipation during the time it switches, thus increasing the maximum allowed time. The usual drawback of low switching frequency is the current ripple that causes losses in the inductors. Since the buck only switches for very short times this is extra power is not significant for steady state operation.

Figure 7:
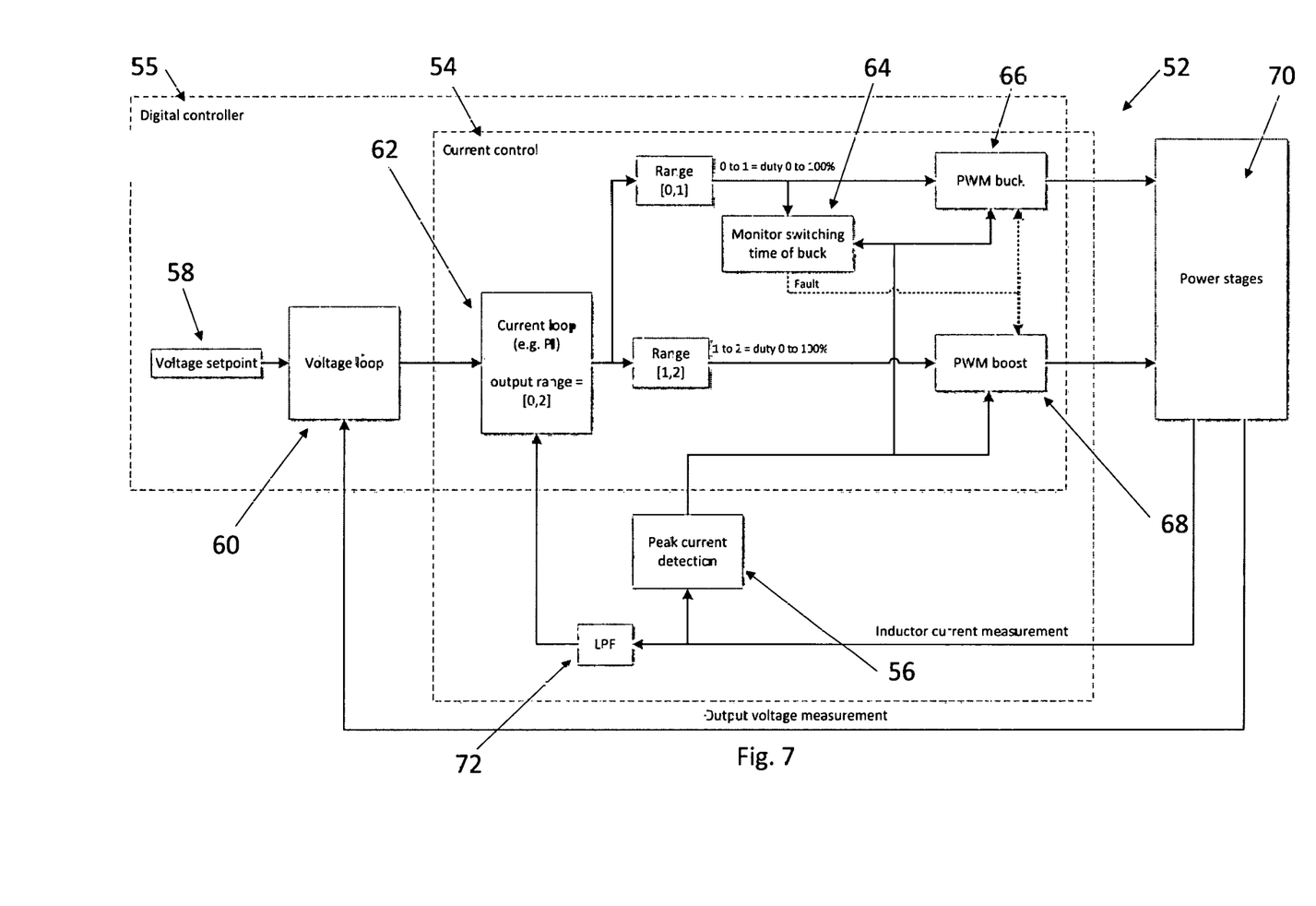
FIG. 7 is a diagram of a current controller having a single current loop.

There is a single current loop based on the average inductor current that controls the duty cycle of both topologies in a smooth and continuous fashion as identified in FIG. 7. The control of the converters is directed by a control system circuit (52). The control system circuit (52) has a digital controller (55) and an analog comparator (56) that is also identified as the peak current detection in the FIG. 7. The digital controller (55) receives inductor current measurements for a duty cycle command from a single loop current feedback during operation. This can be an average of the inductor current. The output of the current loop, called duty cycle command, has a range of 0 to 2. When the duty cycle command equals 0, then both converters are off. When the duty cycle command is higher than zero but less than 1, then the boost stays off, but buck converter goes from 0 to 100% duty. When the duty cycle command is from 1 to 2, then the buck stays at 100% (no switching) and the boost goes from 0 to 100% duty.

The analog comparator (56) detects peak current. When there is a peak current, the analog comparator (56) circuitry then turns the converters off. The length of the off state can be a factor of time, measurement of current, or other variables, or a combination of the variables. The analog comparator (56) also provides input to the switching time monitor (64), which in turn can issue a fault to the converters thereby turning off the converters.

With this scheme, there is only one loop controlling the current during operation, even though there are 2 different converters operating depending on the input to output voltage ratio. This provides that there is only one converter switching at the time. The traditional approach with 2 separate controllers is subject to perturbations and/or delays during the transition of one mode to the other, which are eliminated by the use of a single loop.

The cascaded buck+boost only needs to switch when the output voltage is lower than the input voltage, and this happens only at startup (primary inrush) and after a brown-out (secondary inrush). Since the charging time is minimized by the use of constant current control, this time can be made dramatically shorter than other inrush limiting strategies. As a result of this, under normal conditions the buck semiconductors only need to switch during a very short time (e.g.

less than 100 ms) and at very sporadic times. During normal operation of the unit the buck transistor stays on, thus dissipating only because of conduction losses.

The maximum time the buck is allowed to switch, or the maximum switching time, is defined by the thermal mass/inertia of the system, composed by the semiconductor packages and heatsink. To maximize this time without increasing size and cost, the buck semiconductors can be mounted to the same heatsink as the other semiconductors that dissipate significant power at steady state (e.g. diode bridge or boost converter). The switching time is continually monitored by the controller and if the switching time exceeds the maximum switching time then the buck and boost converters are shutdown.

The concept of allowing the buck converter to switch for short times with longer cool down periods is applicable in most power supplies because primary inrush happens only once when the unit is started, and secondary inrush is a random event that does not happen continuously. Even if brown-outs happened every few seconds, the average usage of the buck converter is still very small.

It is the accurate and reliable monitoring of the time the buck stays switching that prevents the buck from overheating. This is done inside the digital controller that executes the current loop.

The digital controller evaluates the state of the buck switching at every sampling time (e.g. 10 us). If the buck has switched during the last sampling period, then a time counter is increased. When the counter reaches a threshold (e.g. 10000 counts=100 ms), that means that the buck converter switched for too long and it issues a fault signal that turns off the PWM generators (66, 68).

In the preferred embodiment of this invention, the switching time monitor (64) uses the duty cycle command and also the state of the peak current mode control, because they can both independently cause the buck transistor to switch. If the duty cycle is greater than 0 and lesser than 100%, or the peak current mode has made the buck switch to turn off, then the controller will count that period as an active switching. Otherwise if none of those conditions was met, the counter will be decreased.

When the duty cycle is 0 or greater than 1 (i.e. the buck is not switching) and the peak current comparator has not tripped in the last period, the controller decrements the time counter in order to reset it after a certain number of periods. A smaller step is used for decrementing the counter, as compared to the increasing step, to provide asymmetric "on" vs "off" times. The ratio of the increment vs decrement step defines how long the time counter takes to reset, thus defining the minimum time the buck converter will have to cool down. For example, assuming a 10 us sampling time, if the increase step is 1 and the decrease step is 1/100, then with a counter limit of 10000 the buck will be allowed to switch for up to 100 ms and after that it will have to cool down (i.e. not switch) 100× more the time it stayed switching (10 s if it was on for 100 ms).

In order to show the benefits of having a precise limitation of the buck converter switching time, a real life example with assuming 1200V IGBTs and 60 A max input current will be used. If intended to be used for a normal buck with continuous switching, the voltage drop of a fast IGBT voltage can typically be around 2.8V, causing conduction losses of 168 W. A common design criteria is to have switching losses equal to conduction losses, so the total power for the buck portion of the PFC would be 336 W. If it is not intended to provide low switching losses, an ultra-low Vice IGBT can be used, with a voltage drop of around 1.5V. Note that in IGBT semiconductor design, there is a trade-off between voltage drop and switching speed, so a fast IGBT cannot have ultra-low voltage drop at the current state of semiconductor technology. Since switching losses are not existent in steady state, the total power dissipation is reduced to only 90 W (around ¼). For this example, the power dissipation reduction makes possible the use of a single package instead of 4 packages in parallel, reducing also size and cost of the associated heatsink and cooling system.

In case of the buck diode the difference is even bigger, because if the buck does not switch in steady state, the diode dissipates no power and no heatsink/cooling system is required. The only requirement for the diode is to withstand the peak currents, its losses are not critical because it only operates for a very short time.

As a conclusion, since the buck will not switch for long times, the buck semiconductors and cooling system can be optimized, causing a dramatic reduction (on the order of 5 times) in size and cost as compared to a normal buck rated for that power level.

Because the buck transistor can open at any time, this method limits the current even during secondary inrush or any kind of input voltage transients. This is done automatically without any extra circuit or controller because the current is regulated all the time by the single current loop.

In order to provide a fast enough response of the controller to open the buck switch, one embodiment of this invention uses peak current mode with a constant setpoint set at max current. Peak current mode is a well know method that turns off the switch when the instantaneous current reaches a threshold, and turns it back on in the next switching period. Since the peak current limit is fixed in this application, there are no stability issues caused by this type of current control.

In order to provide further protection against abnormal operation, in one embodiment of this invention the controller counts the number of times the peak current limit is hit in a given period. In case this number exceeds a limit, the controller shuts down the buck for a predefined time and then turns back on. In a different embodiment the buck can slay off when the maximum number of peak current hits is reached.

An efficient way of implementing the buck based inrush limit is by combining it with the boost converter, so they use the same inductor and output capacitor, thus minimizing size and cost as illustrated in FIG. 6. A different embodiment of this invention can use a separate buck converter (e.g. with separate passive components) before or after the boost converter.

In the embodiment of FIG. 7, there is a current control scheme (54) that has a PWM generator (66) to drive a buck converter in the power stages (70). There is also a PWM generator (68) to drive the boost converter in the power stages (70). The current loop (62) is coupled to the buck converter and the boost converter by means of the PWM generators (66 and 68). The low-pass filter (72) has an output coupled to the current loop and to an inductor current measurement output of the power stage. The peak current detector (56) is coupled to the inductor current measurement output of the power stage, and a peak current detector output coupled to the buck PWM generator, the boost PWM generator and the monitor of the buck switching time (64). The current controller (54) also has a switching time monitor (64) having a monitor coupled to the current loop, and a monitor coupled to both PWM generators (66, 68).

As identified in FIG. 7, there is a digital controller (55) that has a voltage loop (60) coupled to an output voltage measurement of the power stage (70) and the voltage loop (60) coupled to a voltage setpoint (58). The voltage loop (60) is also coupled to the current loop $I_{[MS1]}$. The digital controller (55) also shares several elements found the current control (54) as is expressed by FIG. 7.

When the value of the current loop (62) output range is zero, a duty cycle of the PWM buck (66) is zero percent and a duty cycle of the PWM boost (68) is zero percent. When the value of the current loop (62) output range is greater than zero and lesser than one, the duty cycle of the PWM buck (66) is equal to that value and the duty cycle of the PWM boost (68) is zero percent. When the value of the current loop (62) output range is between one and two, the duty cycle of the PWM buck (66) is one hundred percent and the duty cycle of the PWM boost (68) is equal to that value minus 1 (i.e. 1 to 2 range maps to 0 to 100% duty). When a peak current value of the inductor current measurement of the power stage (70) is above a predetermined limit, the peak current detector (56) output will cause the PWM buck (66) and the PWM boost (68) to turn off until the next PWM cycle, or for a predefined time. If the buck switching time sensed by the switching time monitor (64) reaches a predetermined limit, the monitor output will cause both converters to turn off for a predefined time. Due to the nature of the PWM range scheme, the current control (54) switches only one of the converters at a time, either PWM buck (66) or PWM boost (68) generate switching patterns (as opposed to a constant state).

While embodiments have been described in detail, it should be appreciated that various modifications and/or variations may be made without departing from the scope or spirit of the invention. In this regard it is important to note that practicing the invention is not limited to the applications described herein. Many other applications and/or alterations may be utilized provided that such other applications and/or alterations do not depart from the intended purpose of the invention. Also, features illustrated or described as part of one embodiment may be used in another embodiment to provide yet another embodiment such that the features are not limited to the embodiments described herein. Thus, it is intended that the invention cover all such embodiments and variations. Nothing in this disclosure is intended to limit the scope of the invention in any way.

What is claimed is:

1. A cascaded buck+boost inrush limiter where the buck converter is only allowed to switch for very short times and stays turned on, or off, during steady state operation comprising:
    an input bridge;
    a buck converter comprising a buck switch and diode, and the buck converter connected to the input bridge;
    a boost converter comprising a boost switch and diode, and the boost converter connected to the buck converter;
    common passive components shared by the buck converter and the boost converter, the common passive components comprising a inductor and a capacitor;
    a control system connected to the buck and boost converters to control the buck and boost converters, the control system comprising:
    i) a digital controller for receiving inductor current measurements for a duty cycle command from a single loop current feedback during operation, the control system operable such that when the duty cycle command equals zero, then the converters are off and when the duty cycle command is higher than zero but less than one the boost converter stays off but the buck converter goes from 0 to 100% duty, and when the duty cycle command is between one and two the buck stays at 100% and the boost goes from 0 to 100% duty, and if the maximum buck switching time is exceeded, then the control system shuts down the converters;
    ii) an analog comparator for peak current detection and during operation if a peak current is detected the buck and boost converters switches are turned off until the next pulse-width modulated period.

2. A switching controller for a power converter with a power stage having an inductor, comprising:
    a current control, comprising:
        a pulse-width modulated (PWM) generator for a buck converter;
        a PWM generator for a boost converter;
        a current loop coupled to the buck PWM generator and the boost PWM generator;
        a buck converter power stage coupled to the buck PWM generator and a boost converter power stage coupled to the boost PWM generator;
        a low-pass filter coupled to the current loop and coupled to an inductor current measurement output of the power stage;
        a peak current detector coupled to the inductor current measurement output of the power stage, and the peak current detector coupled to the buck PWM generator and the boost PWM generator; and
        a switching time monitor coupled to the current loop, the buck PWM generator, and the boost PWM generator; and
    a digital controller, comprising:
        a voltage loop coupled to an output voltage measurement of the power stage, the voltage loop coupled to a voltage setpoint, and voltage loop coupled to the current loop,
    wherein a value of the current loop output range is between about zero and two,
    wherein when the value of the current loop output range is zero, a duty cycle of the pulse-width modulated buck converter is zero percent and a duty cycle of the pulse-width modulated boost converter is zero percent;
    wherein when the value of the current loop output range is greater than zero and less than one, the duty cycle of the PWM buck converter is zero to one hundred percent and the duty cycle of the PWM boost converter is zero percent,
    wherein when the value of the current loop output range is between one and two, the duty cycle of the PWM buck converter is about one hundred percent and the duty cycle of the PWM boost converter is about one hundred percent,
    wherein a peak current value of the inductor current measurement of the power stage is above a predetermined limit, the peak current detector output will cause the buck pulse-width modulated generator and the boost PWM generator to turn off until the next PWM period,
    wherein the voltage loop approximately maintains a voltage represented by the voltage setpoint,
    wherein if a switching time sensed by the switching time monitor a predetermined limit, the monitor output will cause the buck PWM generator and the boost PWM generator to turn off, and
    wherein the current loop switches only one of the buck converter or the boost converter at a time.

3. A method for controlling a current in a power stage having an inductor current measurement and an output voltage measurement, comprising:

- providing a pulse-width modulated (PWM) buck converter having a duty cycle;
- providing a PWM boost converter having a duty cycle;
- sensing the inductor current measurement;
- representing the output of the current loop with a value between zero and two, inclusive;
- if the controller output value is zero, causing the duty cycle of the PWM buck converter to be 0% and the duty cycle of the PWM boost converter to be 0%;
- if the controller output value is greater than zero but less than one, causing the duty cycle of the PWM buck converter to be 0 to 100% and the duty cycle of the PWM boost converter to be 0%;
- if the controller output value is between one and two, causing the duty cycle of the PWM buck converter to be 0 or 100% and the duty cycle of the PWM boost converter to be 100%;
- if the inductor current measurement has a peak greater than a predetermined limit, causing the PWM buck converter and the PWM boost converter to turn off until the next PWM period;
- monitoring a switching time of the PWM buck converter, wherein if the switching time is above a predetermined limit, turning off the PWM buck and boost converters,
- providing a voltage loop;
- measuring the output voltage measurement by the voltage loop;
- providing a voltage setpoint;
- maintaining a loop voltage in the voltage loop to be about the voltage setpoint;
- adjusting a representation of the inductor current measurement using the voltage loop, wherein the inductor current measurement and the output voltage measurement are each a representation of a closed loop with the power stage; and
- configuring the PWM buck converter and the PWM boost converter to be a cascaded buck+boost converter combination.

* * * * *